Oct. 1, 1963 P. W. STANCLIFT 3,105,346
TREE CROP HARVESTER
Filed July 31, 1961 6 Sheets-Sheet 2

Paul W. Stanclift
INVENTOR.

BY *Clarence A.O'Brien*
*and Harvey B. Jacobson*
Attorneys

Oct. 1, 1963

P. W. STANCLIFT 3,105,346

TREE CROP HARVESTER

Filed July 31, 1961

Paul W. Stanclift
INVENTOR.

BY Clarence A. O'Brien
and Harvey B. Jackson
Attorneys

Fig. 13

Paul W. Stanclift
INVENTOR.

United States Patent Office 3,105,346
Patented Oct. 1, 1963

3,105,346
TREE CROP HARVESTER
Paul W. Stanclift, 2966 McKee Road, Merced, Calif.
Filed July 31, 1961, Ser. No. 128,078
17 Claims. (Cl. 56—329)

This invention relates to a harvesting machine involving the collection of fruit and nuts shaken loose from trees with respect to which the harvesting machine is positioned.

Tree crop harvesting machines have heretofore been constructed in the form of foldable catching frames which when extended form rigid geometrical figures that encircle the tree trunk to receive the crop from the tree as a shaker vibrates the tree trunk. The foldable frames heretofore utilized have been bulky, expensive and limited in use to a particular class or size range of trees and have required considerable effort and labor to extend about a tree and otherwise operate. It is therefore a primary object of the present invention to provide a tree crop harvester which eliminates the difficulty heretofore encountered with tree crop harvesting machines by providing a harvesting machine that is compact, maneuverable, less restricted in use and capable of being handled by a single person.

A further object of this invention is to provide a tree crop harvester utilizing a foldable crop receiving frame mounting in shock absorbing relation thereabove a canvas to form an inverted umbrella formation when the frame is extended in encircling relation about a tree trunk.

Another object of this invention is to provide a tree crop harvester having a foldable canvas frame for collecting the tree crop thereabove and a collecting trough receiving the crop from the canvas delivering the crop to a conveyor mechanism by vibration of the collecting trough.

An additional object of this invention is to provide a tree crop harvesting machine which includes a tree embracing flexible seal that is connected to the collecting trough radially spaced from the tree trunk and capable of yieldably embracing trees of different sizes and shapes so as to prevent loss of crop between the tree trunk and the collecting trough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 5:
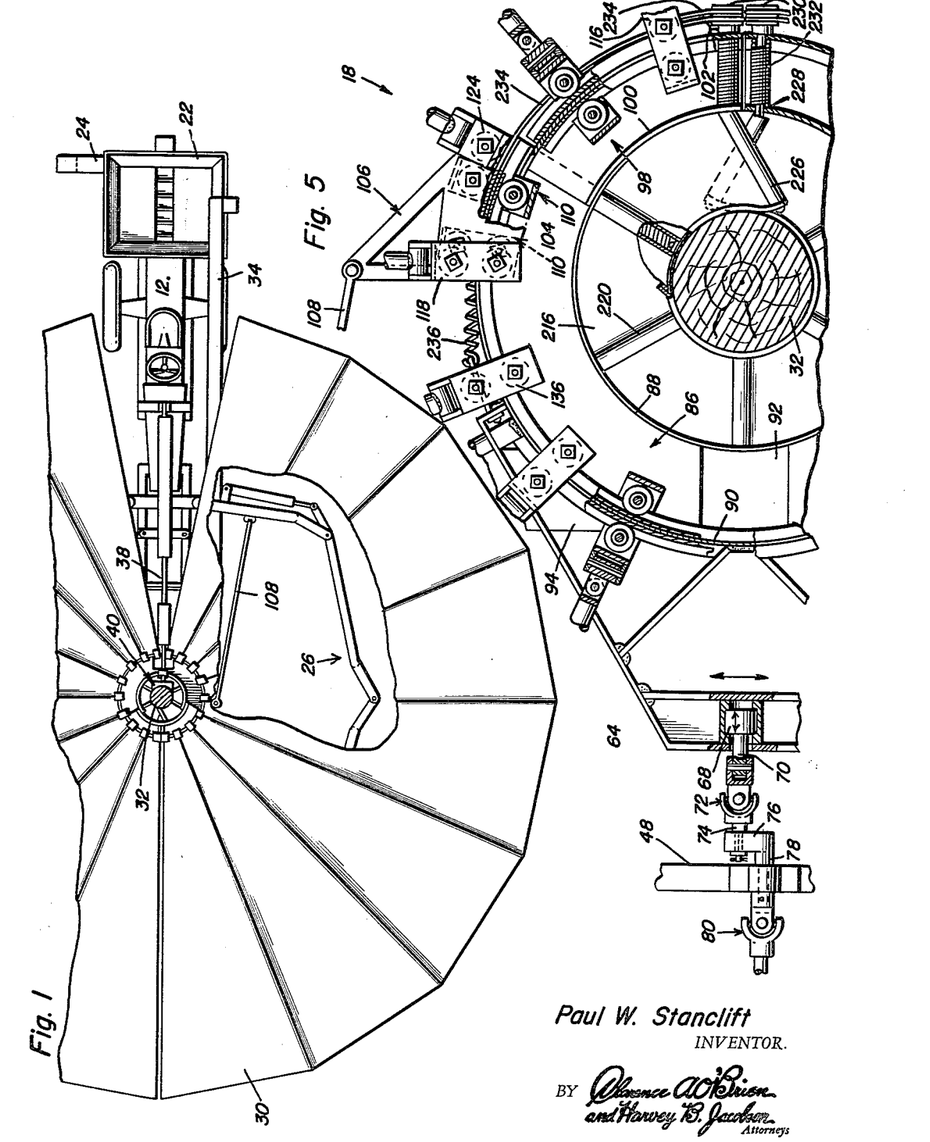
FIGURE 1 is a partial top plan view with parts broken away of the folding frame assembly of the tree crop harvester machine of the present invention in its extended condition.
FIGURE 5 is an enlarged partial sectional view of the harvester with parts shown in section.
Figures 2, 12:
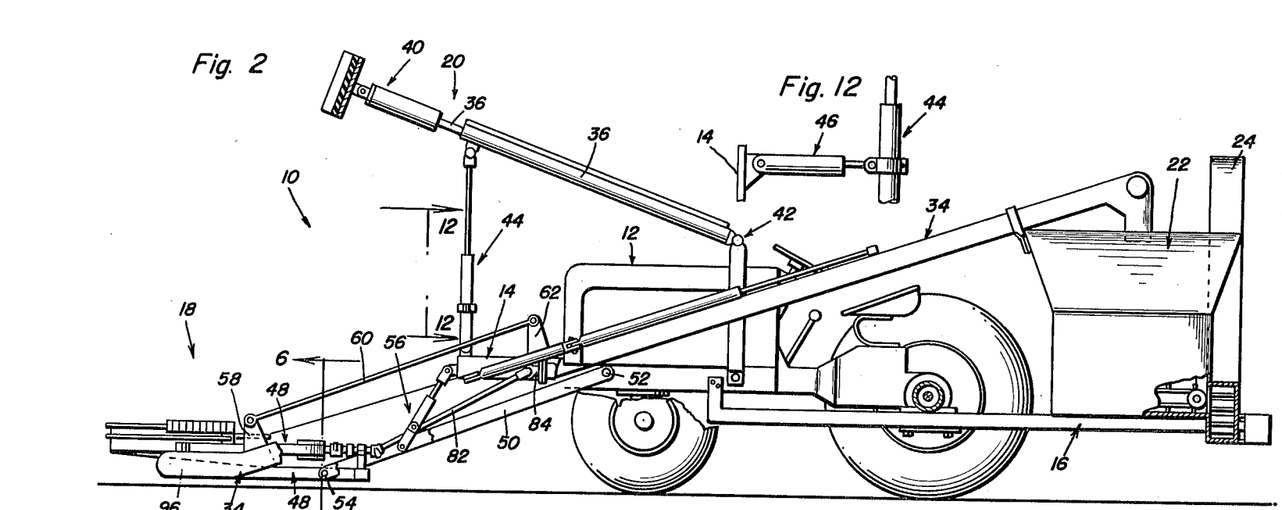
FIGURE 2 is a side elevational view with parts removed, parts broken away and parts shown in section, illustrating the tree crop harvester machine in its retracted condition.
FIGURE 12 is a partial front elevational view as viewed from a plane indicated by section line 12—12 in FIGURE 2.
Figures 3, 10, 11:
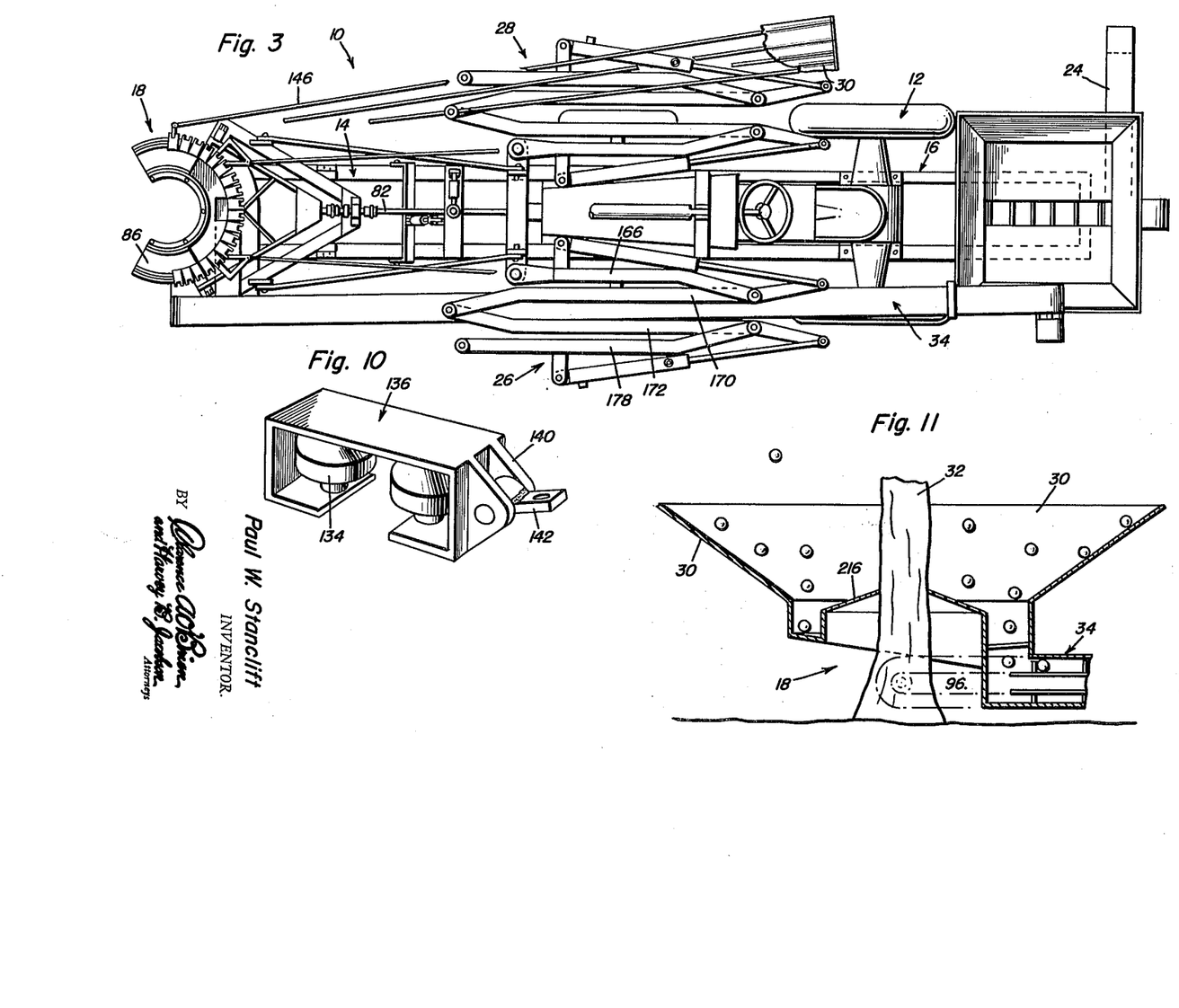
FIGURE 3 is a top plan view of the harvester machine in its retracted condition with certain parts broken away or removed.
FIGURE 10 is a perspective view of a canvas carriage element of the harvester machine.
FIGURE 11 is a diagrammatic sectional view of the collecting frame assembly of the harvester encircling a tree trunk.

Referring now to the drawings in detail, it will be observed from FIGURES 2 and 3, that the harvester machine which is generally referred to by reference numeral 10 is shown in its retracted or folded condition and is mounted on a conventional-type tractor vehicle generally referred to by reference numeral 12. A special mounting frame assembly including a forward positioning frame portion 14 and a rear frame portion 16 is mounted on the tractor vehicle 12 with the forward portion 14 extending forwardly of the vehicle 12 while the rear portion 16 extends rearwardly therefrom. Adjustably mounted on the forward frame portion 14 and disposed forwardly of the tractor vehicle, is the crop collecting assembly generally referred to by reference numeral 18 adapted to be positioned adjacent to a tree trunk by the forward positioning frame portion 14. Also mounted on the tractor and extending forwardly therefrom and above the collecting assembly 18 is a tree shaking mechanism generally referred to by reference numeral 20. The rear frame portion 16 on the other hand mounts a collecting bin 22 for the harvester from which the crop may be delivered by means of the delivery conveyor 24. Also mounted on opposite sides of the tractor vehicle adjacent the forward end htereof, are a pair of foldable frame assemblies 26 and 28 which also support in folded condition, and spaced thereabove, a canvas crop receiving material 30. Accordingly, when the folded frame assemblies 26 and 28 are extended in encircling relation about a tree trunk 32 such as shown in FIGURE 1, an inverted open umbrella formation is formed for the purpose of receiving the tree crop shaken loose from the tree limbs disposed above the tree trunk. Referring therefore to FIGURE 11, it will be observed that the inverted umbrella formation of the canvas 30 directs the fruit or nuts that wall from the tree limbs into the collecting assembly 18 for delivery by the conveyor mechanism 34 to the collecting bin 22 mounted rearwardly of the tractor vehicle.

Referring now to FIGURE 2, it will be observed that the shaker mechanism 20 is provided for the purpose of engaging the tree trunk above the collecting assembly 18. The shaker assembly 20 therefore includes a knocking boom assembly 36 including an extensible piston rod member 38 that may be extended from the boom assembly 36 by any suitable hydraulic power mechanism for engagement of the tree trunk by any conventional type knocking head assembly 40 provided at the forward end of the extensible rod member 38. The boom assembly 36 on the other hand is pivotally mounted rearwardly thereof by a universal joint 42 mounted in spaced relation above the tractor 12. An elevating piston assembly 44 is also universally mounted at the forward end of the forward frame portion and universally connected to the boom assembly 36 in order to elevate the assembly for engaging trees of different sizes. As more clearly seen in FIGURE 12, the frame portion 14 also includes a lateral actuating piston assembly 46 that is connected to the elevating piston assembly 44 and hydraulically operated in order to laterally shift the boom assembly 36 for accommodating tree trunks of different shape lengthwise. It will therefore be apparent, that with the engaging head assembly 40 in contact with the tree trunk in spaced relation above the collecting assembly 18, reciprocatory movement may be imparted to the tree trunk by the assembly 40 in order to vibrate the tree and thereby shake loose the fruits or nuts from the tree limbs.

Figure 6:
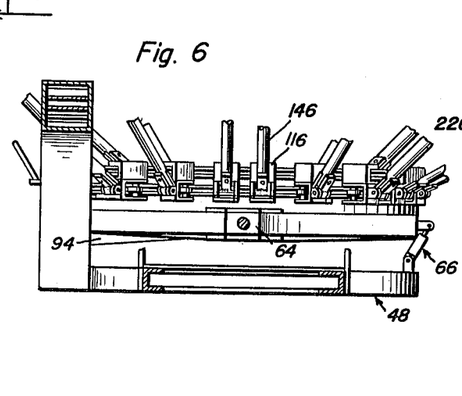
FIGURE 6 is a partial sectional view taken substantially through the plane indicated by section line 6—6 of FIGURE 2.

The collecting assembly 18 is mounted on a collecting frame assembly generally referred to by reference numeral 48 which is supported by a link member 50 pivotally mounted adjacent the forward end of the tractor vehicle at one end 52. The other end 54 is pivotally connected to the frame assembly 48. The frame 48 is adjustably elevated by means of an elevating piston assembly 56 which is pivotally connected to the forward end of the frame portion 14 and also to the mounting link member 50. Accordingly, the piston assembly 56 may be actuated in order to effect a certain degree of elevation of the frame assembly 48. However, in order to maintain the frame 48 parallel to a slight rearward inclined angle, a pair of upstanding bracket members 58 are rigidly connected to the frame 48 and are link connected by link members 60 to bracket members 62 mounted on the forward frame portion 14. A vibratory collecting frame assembly 64 as more clearly seen in FIGURE 5, is mounted in spaced relation above the frame 48 by a pair of link assemblies 66 connected to opposite sides thereof, one of which link assemblies 66 is shown in FIGURE 6. The vibrating collecting frame assembly 64 is supported at its third location by means of a bearing 68 mounted on a rod 70. The rod 70 is connected by a universal joint 72 to an eccentric pin 74 pivotally connected to a crank 76 mounted on a crank shaft 78 which is journalled in the frame assembly 48 as shown in FIGURE 5. The crank shaft 78 is connected by a universal joint 80 to a drive shaft 82 which is universally connected to a power take-off 84 from the tractor vehicle, as more clearly seen in FIGURE 2. It will be apparent, that upon rotation of the power take-off 84, vibratory movement will be imparted to the collector frame 64 including lateral and up and down motion.

Figure 7:
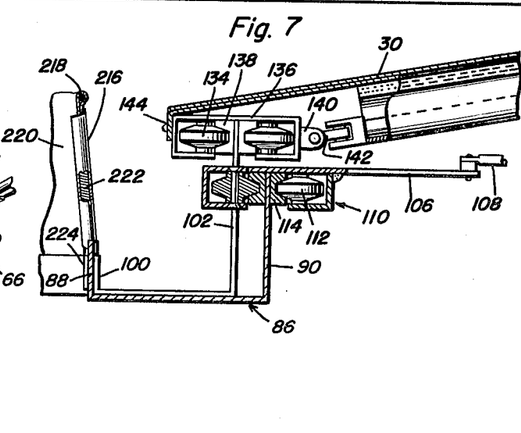
FIGURE 7 is a partial sectional view taken substantially through a plane indicated by section line 7—7 in FIGURE 4.
Figure 13:
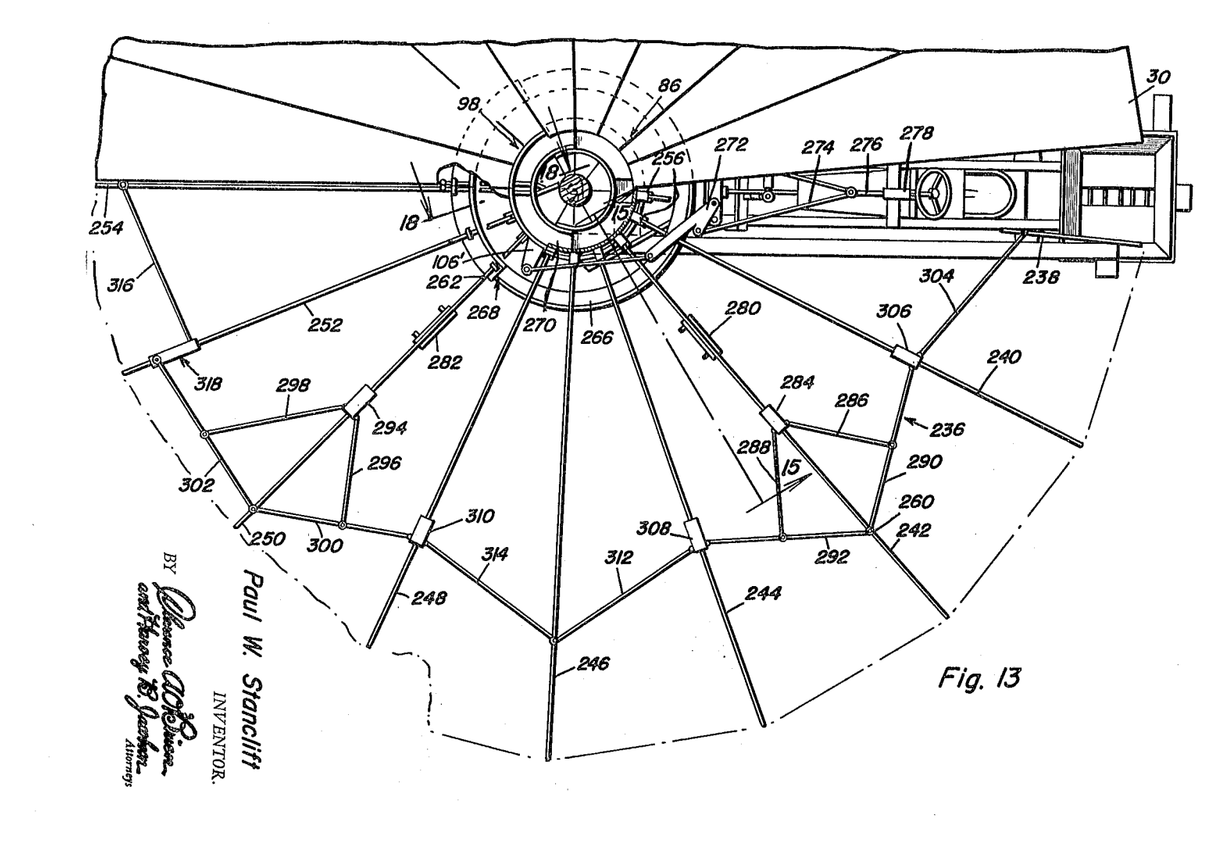
FIGURE 13 is a partial top plan view with parts broken away of another form of folding frame assembly in extended condition.

Referring now to FIGURES 5 and 7 in particular, it will be observed that the vibrating frame assembly 64 rigidly mounts forwardly thereof, a collecting trough 86 which is vibrated with the frame assembly 64. The trough 86 is arcuate in shape as shown in FIGURE 3. Accordingly, the trough may be positioned against a tree trunk. The trough 86 includes therefore an inner arcuate rim 88 which is disposed adjacent the tree trunk and an outer arcuate rim 90 which is of greater height than the inner rim 88. Disposed rearwardly of the trough 86 is a discharge opening 92 into which the crop collected within the trough 86 may drop and be conducted by a discharge duct 94 extending laterally from the opening 92 toward the inlet end 96 of the rearwardly and upwardly inclined conveyor mechanism 34. The crop is thereby transported to the rear of the vehicle and deposited within the collection bin 22. The trough 86 slidably mounts a pair of movable trough sections 98 which form tree encircling extensions of the collecting trough. The movable trough sections are therefore also provided with an inner arcuate rim 100 and an outer arcuate rim 102. When fully extended, the sections 98 complete a circle about the tree trunk 32 as shown in FIGURE 5. Each of the movable trough sections 98 includes an extended outer rim portion 104 to which an operating arm member 106 is connected. A control rod 108 is therefore pivotally connected to each arm member 106 for the purpose of actuating the arm member and thereby the movable trough sections 98 between their extended and retracted condition. In order to guidingly mount the movable trough sections 98 for slidable movement with respect to the collecting trough 86, the actuating arm members 106 are provided with a pair of guiding roller assemblies 110. The assemblies 110 include a pair of rollers 112 which engage opposite sides of a track formation 114 fixed to the upper end of the outer rim 90 of the collecting trough 86. The movable trough sections 98 in their fully extended position remain however in overlapping relation to the collecting trough 86 and remain guided on the rail 114 of the outer rim 90 by virtue of the mounting of the arm roller assembly 110 on the extended portions 104 of the outer rim of the movable trough sections 98.

Figures 4, 8, 9:
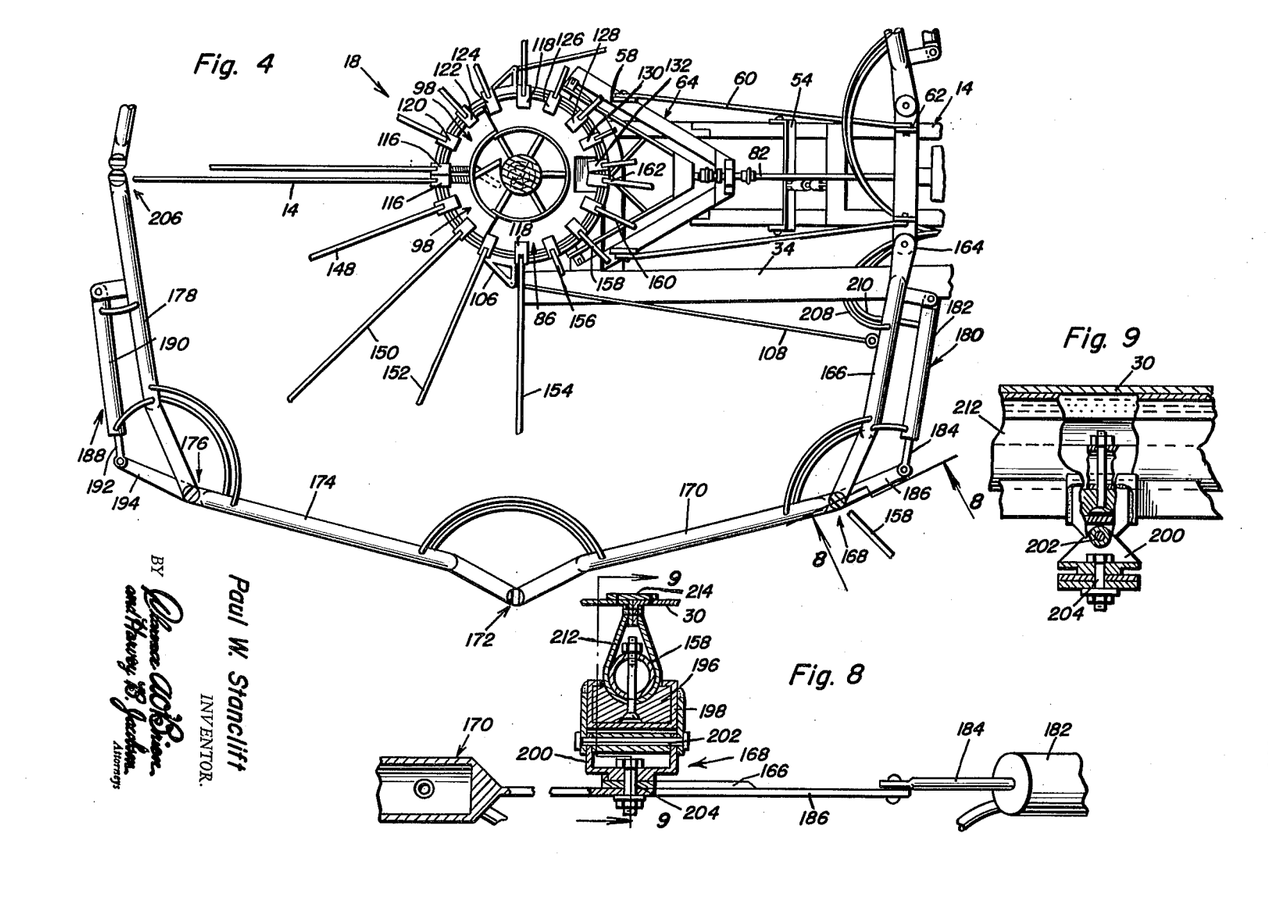
FIGURE 4 is a partial enlarged top plan view of a portion of the harvester machine in its extended condition.
FIGURE 8 is a partial sectional view taken substantially through a plane indicated by section line 8—8 in FIGURE 4.
FIGURE 9 is a sectional view taken substantially through a plane indicated by section line 9—9 of FIGURE 8.

Referring now to FIGURES 4 and 5, it will be observed that the outer rim of the trough 86 and the trough sections 98 guidingly mount a plurality of rib carriers. A lead carrier 116 is mounted at the forward end of each of the movable trough sections 98. Actuating carriers 118 are also fixedly mounted on the operating arm members 106. A plurality of actuated carriers 120, 122 and 124 are mounted between the lead carriers 116 and the actuating carriers 118. The carriers 120, 122 and 124 are of course slidably mounted on the outer rim 102 of the movable trough sections 98. Mounted on the outer rim 90 of the collector trough 86 on the other side of the actuating carriers 118, are a plurality of carriers 126, 128, 130 and 132. It will therefore become apparent, that the carriers 118 move all of the carriers 120, 122 and 124 forwardly thereof into spaced position as illustrated in FIGURE 4 when the collector assembly 18 is extended while the actuating carriers 118 move all of the carriers 126, 128, 130 and 132 rearwardly against each other when the assembly 18 is retracted. All of the carriers are of similar construction as shown in FIGURES 7 and 10. The carriers accordingly mount a pair of guide rollers 134 within a downwardly opening channel member 136 for receiving between the rollers 134 a rail member 136 either mounted on the upper ends of the outer rim members 90 of the collector trough 86 or 102 of the movable trough sections 98. Disposed on the outer side of the channel member 136 are pivot ears 140 to which an element 142 is pivotally connected for pivot connection to radiating supporting ribs that support the canvas 30 thereabove. The spacing of the carriers in the extended condition of the collecting assembly 18 is therefore effected by virtue of the connection of the radially inner end portions 144 of the canvas 30 to the respective carriers as more clearly seen in FIGURE 7.

As more clearly seen in FIGURE 4, there are nine canvas supporting ribs that are pivotally connected to the respective carriers on each lateral side of the collecting assembly 18. Supporting ribs 146 are connected to the lead carriers 116 followed by supporting ribs 148, 150 and 152 pivotally connected to the carriers slidably mounted on the rims of the movable trough sections 98. Supporting ribs 154 are pivotally connected to the carriers 118 fixedly mounted on the operating arms 106 while supporting ribs 156, 158, 160 and 162 are pivotally connected to the carriers slidably mounted on the outer rim 90 of the collector trough 86. It will therefore be apparent, that the movement of the carriers between their stacked positions as illustrated in FIGURE 3 to their extended and spaced positions as illustrated in FIGURE 4, will unfold the canvas 30 into the inverted umbrella shape as illustrated in FIGURES 1 and 11.

In order to support the canvas halves 30 in their extended condition and also simultaneously move the carriers and supporting ribs to their extended spaced positions, the foldable frame assemblies 26 and 28 are provided. Both of the foldable frame assemblies are similar in construction and arrangement except that they are pivotally anchored on opposite sides of the tractor vehicle 12. Referring therefore to FIGURES 3 and 4 in particular, it will be observed that an anchor pivot 164 is mounted on opposite lateral sides of the tractor vehicle to which anchoring frame members 166 are pivotally connected. Each frame member 166 is pivotally connected by a joint assembly 168 to a frame member 170. The frame member 170 is pivotally connected by joint 172 to frame member 174. Joint assembly 176 pivotally connects the frame member 178 to a terminal frame member 174. In order to actuate the foldable frame assemblies 26 and 28 between their folded and extended position, a hydraulic actuating mechanism 180 is pivotally mounted on the member 166 by means of a cylinder portion 182. The mechanism 180 therefore also includes an extensible piston portion 184 which is pivotally connected to the projecting arm 186 of the frame member 170. A second hydraulic actuating mechanism 188 for each of the foldable frame assemblies is provided and includes a cylinder portion 190 pivotally mounted on the terminal frame member 178 and further includes an extensible piston portion 192 that is pivotally connected to the extension arm 194 of the frame member 174. When the piston portions 192 and 184 of the hydraulic actuating mechanisms 190 and 180 are retracted, the foldable frame assembly is extended as illustrated in FIGURE 4. When however, the piston portions are extended, the frame assembly is folded as indicated in FIGURE 3.

It will be further apparent, that the actuating rods 108 pivotally connected to the operating arms 106 for the movable trough section 98 are pivotally connected to the frame members 166 so that when the foldable frame assemblies are in their extended positions, the operating arms 106 are slidably shifted to the position illustrated in FIGURE 4 so as to move the carriers into their spaced position. On the other hand, when the frame members 166 are in their folded position, the actuating rods 108 are pulled rearwardly so as to retract the operating arms 106 to positions in which the carriers are stacked as illustrated in FIGURE 3. It will be further observed, that the supporting ribs 158 and 150 are pivotally connected to the joints 168 and 176 respectively which pivotally interconnect the foldable frame elements. Referring therefore to FIGURE 8 in particular, it will be observed that the supporting rib 158 is connected to a slide block 196 which is slidably movable within a channel member 198 pivotally mounted on a pivot bracket 200 by means of pivot pins 202. The pivot bracket 200 is in turn pivotally connected by pivot bolts 204 to the supporting arm member 170 and the frame member 166. An identical joint construction is involved at the joint 176 between the frame members 174 and 178 and the supporting rib 150. It will therefore be apparent, that with the extension of the foldable frame assembly, the canvas supporting rib 158 and 150 will be angularly shifted with the extension of the foldable frame assemblies by means of the joints 168 and 176 which also accommodate slidable movement of the supporting ribs with respect to the foldable frame assemblies. On the other hand, the supporting ribs 154 and 146 are pivotally connected to the pivot joints 172 and 206, respectively, so that the ribs 154 and 146 may be angularly shifted by extension of the foldable frame assemblies and also cause the frame assemblies to fold rearwardly against the tractor vehicle as illustrated in FIGURE 3.

It will be appreciated from the foregoing, that in order to effect extension of the foldable frame assemblies, the hydraulic actuating mechanism 180 and 188 must be simultaneously actuated in both directions. Accordingly, each of the frame members of the foldable assemblies form seprated fluid conducting passages therewithin in order to provide fluid communication to the opposite ends of the cylinder portion 182 and 190 from the hydraulic conduits 208 and 210.

Referring now to FIGURES 8 and 9, it will be observed that the canvas halves 30 are supported in spaced relation above the supporting ribs in taut condition when extended so as to provide a shock absorbing surface for the crop falling thereon. The ribs are therefore provided with spacer members 212 the upper ends of which clamp therebetween abutting section seams of the canvas which is also provided with a reinforcing strip 214 over the seam.

It will be appreciated, that the inner rim portions of the collection trough 86 and movable trough sections 98 will be spaced from the tree trunk about which the collecting assembly 18 is disposed. It is therefore desirable to provide a sealing assembly between the tree trunk and the inner rim of the collecting trough in order to prevent loss of crops between the tree trunk and the collecting trough regardless of the size of the tree trunk. A sheet of imperforate canvas 216 as more clearly seen in FIGURES 5 and 7 is therefore provided having a lower hem connected to the inner rim 88 of the collector trough 86 and an upper peripheral trunk contacting hem formed about a cable 218 which is adapted to embrace and contact the tree trunk. The canvas sheet 216 itself in its extended condition forms a truncated conical shape for such purpose. However, a plurality of spaced yieldable rib assemblies 220 are provided including a spring element 222 enclosed within a canvas pocket formed on the canvas 216 with the lower end of the spring element 222 being anchored by anchor 224 to the inner rim 88 of the trough 86. The rib assemblies 220 therefore bias the canvas sheet 216 to an upright position tending to form a cylinder when the canvas is extended about the tree trunk. The opposite ends of the canvas 216 are however provided with arms 226 which pull the upper hem portion of the canvas into overlapping relation to each other when the assembly 18 is in its extended condition in order to variably form the truncated conical shape against the bias of the yieldable spring rib assemblies 220 in accordance with the tree trunk diameter engaged by the upper hem. The arms 226 are therefore connected to stub shaft elements 228 that are rotatably mounted in the inner rim 100 of the movable trough section 98 adjacent the leading edges of the movable trough sections 98 for connection to operating pulley wheels 230 through torsion spring elements 232. Each of the pulley wheels 230 has several windings of cable 234 entrained thereabout one end of the cable 234 being anchored to the lead rib carrier 116. The other end of the cable extends below the pulley wheels 230 and is connected to a spring element 236 which in turn is anchored to the frame 64. It will therefore be apparent that when the rib carrier 116 is moved to its retracted position, it will be operative through the cable 234 to rotate the pulley wheel 230 and tension the spring element 232 in order to cause the arms 226 at the opposite ends of the canvas 216 to retract the canvas from the tree trunk and permit it to be folded in upright position. When on the other hand, the lead carriers 116 are brought to their extended positions, they will operate through the cable 234 to cause the torsional springs 232 to pivotally displace the arms 226 in order to bring the ends of the canvas 216 into overlapping relation to each other as illustrated in FIGURE 5 in order to contract the upper hem of the canvas 216 to embrace the tree trunk in sealing fashion. The lower hem of the canvas while fixed to the inner rim 88 of the collector trough 86 will not be connected to the inner rim 100 of the movable trough sections 98 in order to permit the canvas to be folded when the movable trough sections are retracted within the trough 86.

From the foregoing description, operation and utility of the harvesting machine of the present invention will be apparent. It will therefore be recalled that since unfolding of the harvester may be accomplished by power operated mechanism, a single operator may handle the harvesting machine of the present invention by means of selective hydraulic and other controls of conventional form including the actuation of the shaker mechanism 20 and extension thereof into engagement with the tree above the collector assembly 18 for loosening the crop from the tree wehn reciprocated. The collector assembly 18 may be elevated to its proper position and the foldable assemblies 26 and 28 extended into encircling relation about the tree trunk by simultaneous supply of fluid pressure to the hydraulic actuating mechanism 180 and 188 on each of the assemblies 26 and 28. The canvas halves 30 will then be formed in an inverted umbrella shape in spaced taut relation above the supporting ribs. The ribs 146, 154, 150 and 158, being connected to the unfolding frame, facilitate unfolding thereof by the hydraulic actuating mechanism 188 and 190 arranged to distribute the unfolding power for easier and more reliable operation. The carrier members are therefore also drawn around the tree trunk and the movable collector trough sections thereby extended into embracing relation about the tree trunk. Movement of the slidably mounted lead carrier 116 in encircling relation about the tree trunk are also effective through the pulley and cable mechanism to cause overlapping of the sealing canvas 216 to form the truncated conical shape with the upper hem portion embracing the tree trunk in order to prevent loss of crop between the tree trunk and the collecting trough. The crop shaken loose by the shaker mechanism onto canvas 30 will collect in the collector trough which is disposed at a slight rearward incline as hereinbefore indicated. In addition thereto the power take-off 84 imparts a vibratory motion to the supporting frame 64 for the collector trough through the crank and universal joint connections to the supporting frame 64 link supported above the adjustable frame 48. The crop is thereby propelled rearwardly and dropped through the opening 92 in the collector trough moving along the discharge duct 94 into the inlet end of the rearwardly and upwardly extending conveyor mechanism 34 for delivery of the crop to the collection bin 22 from which the crop may be distributed by the conveyor mechanism 24.

Figures 14, 16, 17:
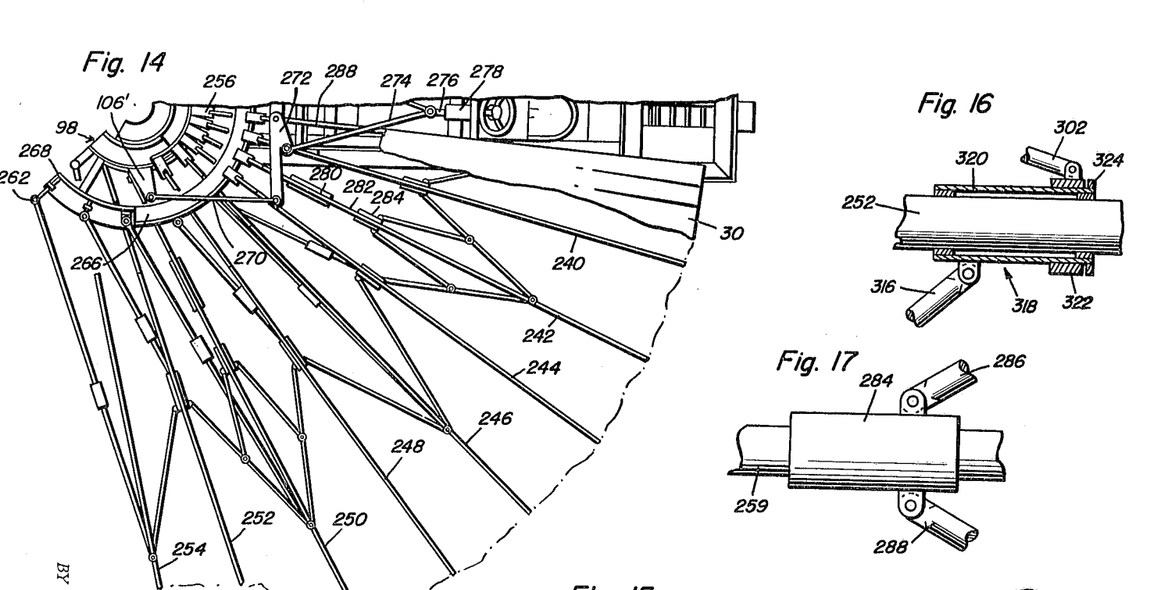
FIGURE 14 is a view similar to FIGURE 13 but showing the folding frame assembly in a partially folded condition.
FIGURE 16 is a partial enlarged top plan view with parts shown in section of a slide assembly on one of the supporting rib assemblies.
FIGURE 17 is a partial enlarged top plan view of a slide assembly on another supporting rib assembly.

A second form of the invention is illustrated in FIGURES 13–17 which differs from that described with respect to FIGURES 1 through 12, in the construction of the foldable frame assembly. The foldable frame assembly in this second embodiment of the invention, is generally referred to by reference numeral 236, one-half of which is shown in its extended condition in FIGURE 13 encircling a tree. The foldable frame 236 is connected to a plurality of spaced supporting ribs 238, 240, 242, 244, 246, 248, 250, 252 and 254 which support thereabove the foldable canvas material 30 in a manner similar to that described with respect to the supporting ribs 146 through 162 in the first embodiment of the invention. The supporting rib assemblies 238, 240, 242 and 244 are pivotally supported at their radially inner ends by pivot assemblies 256 which are slidably mounted on the fixed trough 86 as described with respect to the first embodiment of the invention. The movable trough section 98 on the other hand are pivotally supported in fixed spaced relation to the support rib assemblies 246, 248, 250, 252 and 254. The foldable frame assembly 236 may thereby be retracted to its folded condition without interference of the parts as will be apparent from FIGURE 14 showing a partially folded condition. Each of the supporting rib assemblies 238 through 244 is further supported by means of a rib support brace assembly 258 rigidly connected to section 328 of the rib assembly as more clearly seen in FIGURE 15, the inner end of which is pivotally connected by pivot 262 to a slide element 264 mounted on a rib support track 266 fixed to the frame 64. A sliding rib track 268 is also provided on the frame for rod assemblies connected to supporting rib assemblies 250, 252 and 254 which are pivotally connected in fixed spaced relation to each other on the movable trough sections 98. In order to extend the movable trough sections 98 and the slidable rib supporting track 268 connected thereto through the supporting ribs 250, 252 and 254 and bracing assemblies 258, operating arms 106' are connected to each of the slidable troughs 98. Each of the operating arms 106' are interconnected by connecting link 270 to an actuating lever member 272 are interconnected by links 274 to the piston rod 276 of a hydraulic actuating cylinder 278 supplied with fluid under pressure for the purpose of extending the collector troughs 98 and the foldable frame assembly 236.

Actuated simultaneously with the hydraulic cylinder device 278, are a plurality of hydraulic cylinder devices 280 and 282 fixedly mounted below the supporting rib assemblies 242 and 250 respectively. As more clearly seen in FIGURE 15, the hydraulic cylinder device 280 is mounted on the bracing member 259 adjacent its inner end and includes a piston rod 281 which is connected to a slide member 284. The slide member 284 as more clearly seen is pivotally connected to a pair of link arms 286 and 288 which in turn are pivotally connected at their radially outer ends to adjacent frame members 290 and 292 which are pivotally interconnected to each other and to the supporting rib 242 at a fixed location thereon by means of the pivot 260. The hydraulic cylinder device 282 is similarly operatively connected to the slide 294 on the supporting rib 250 which slide 294 is link connected by links 296 and 298 to the pivotally interconnected frame members 300 and 302. The frame member 290 is operatively connected to the frame member 304 by means of a slide device 306 which is mounted on the supporting rib 240. The other end of the frame member 304 is pivotally connected at a fixed location to the supporting rib 238. It will therefore be apparent, that when the pivotally interconnected frame members 290 and 292 are pivotally displaced with respect to each other by means of the hydraulically actuated slide device 284, the slide device 306 will be slidably displaced with respect to the supporting rib 240 to displace the frame member 304 which is pivotally connected to the frame member 290 by means of the slide device 306. Similar slide devices 308 and 310 on ribs 244 and 248 pivotally interconnect the frame member 292 with the frame member 312 and the frame member 300 with the frame member 314. The frame members 312 and 314 are in turn pivotally interconnected with each other and to the supporting rib 246 at a fixed location thereon. The frame member 316 which is disposed between the closing rib member 254 and its adjacent rib member 252, is pivotally connected at a fixed location on the supporting rib 254 and to the frame member 302 by means of the slide device 318. Referring therefore to FIGURE 16 in particular, it will be observed that the slide device 318 is arranged to accommodate shifting movement of frame members 302 and 316 that occur as a result of the extension and retraction of the foldable frame assembly 236 and the supporting ribs. The frame member 316 is therefore pivotally connected to a tubular slide member 320 of the slide device 318 which is slidably mounted on the supporting rib 250. A slidable collar 322 is in turn slidably mounted on the tubular slide member 320 and axially limited by the stop collar 324. The frame member 302 is therefore pivotally connected to the collar 322. The foldable frame assembly 236 together with the supporting ribs may thereby be folded and unfolded by actuation of the hydraulic cylinder devices 280 and 282 without binding or locking and with the power distributed to the frame members in such a manner as to enable the unfolding and folding to be accomplished smoothly.

Referring again to FIGURE 15, it will be observed that each of the rib assemblies includes a radially inner section 326 supported at an inner and by pivot assembly 256 and the radially outer section 328 pivotally connected by clevis assembly 325 to the section 326. The section 328 being rigidly connected to the brace assembly 258 is therefore pivotally supported by the pivot assembly 262 spaced below the pivot 256. Accordingly, bending of the rib assemblies is accommodated in response to vibration of the collector troughs that support the rib assemblies to assist the downward movement of the crop received on the canvas support above the rib assemblies as described with respect to FIGURES 1–12.

Figures 15, 18:
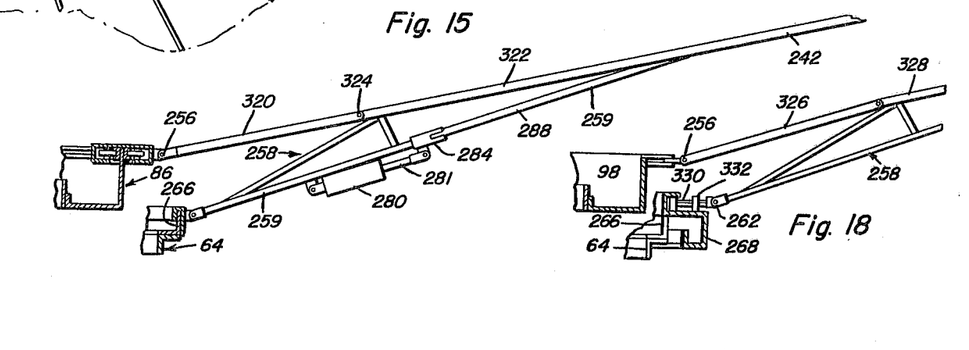
FIGURE 15 is a partial sectional view of one of the supporting rib assemblies as viewed from section line 15—15 in FIGURE 13.
FIGURE 18 is a partial sectional view of another rib assembly as viewed from section line 18—18 in FIGURE 13.

In order to accommodate proper folding of the rib assemblies 246, 248, 250, 252 and 254, it will be observed from FIGURE 18, that each pivot assembly 256 mounted in fixed spaced relation on the slidable trough 98, is maintained in vertical radial alignment with the pivot 256 by being connected to a member 330 supported by spaced bearings 332 mounted on the slide 268 movable along the track 266 on the frame 64.

The tree crop harvester as described with respect to FIGURES 13 through 17 is otherwise the same as that described with respect to FIGURES 1 through 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree crop harvester adapted to be mounted on a tractor type vehicle or the like comprising, positioning frame means mounted on the vehicle for extending forwardly therefrom toward a tree trunk, collector means mounted on the frame means for receiving said tree trunk therein and extensible to a rigid condition in spaced encircling relation to said tree trunk, flexible sealing means connected to the collector means and extensible therewith to overlappingly encircle said tree trunk in yieldable contact therewith, and foldable means mounted on the vehicle and operatively connected to the collector means for unfolding simultaneously with the extension of the collector means and the flexible sealing means into encircling relation with the tree trunk for receiving and directing falling crop into said collector means.

2. The combination of claim 1 including vibratory means operatively connected to the frame means and spaced above the ground for imparting vibratory movement thereto tending to propel the collected crop rearwardly of the collecting means.

3. The combination of claim 2, including conveyor means connected to the collector means in spaced relation to the tree trunk for receiving and conveying the crop rearwardly of the vehicle.

4. The combination of claim 3, including means mounted on the vehicle for vertically adjusting the frame means and link means operatively connected to the frame means and vehicle for maintaining the frame means parallel to a predetermined rearward inclination for all adjustable positions to produce gravity induced movement of the crop in the collector means.

5. The combination of claim 4 wherein said collector means comprises an arcuate trough fixedly mounted on the frame means for partially encircling the tree trunk, movable trough means slidably mounted in the fixedly mounted trough and extensible therefrom to complete encirclement of the tree trunk and actuating means operatively connected to the movable trough means for extension thereof in response to extension of the foldable means.

6. The combination of claim 5, wherein said flexible sealing means comprises a sheet of foldable material having spaced hems respectively connected to the collector means and adapted to contact the tree trunk, spaced yieldable rib means connected to the sheet of material tending to hold the sheet of material in a cylindrical shape and tensioning means operatively connected to opposite ends of the sheet of material and operative in response to extension of the collector means to overlap the trunk contacting rim at opposite ends thereof to contact the tree trunk and form a truncated conical shape thereabout.

7. The combination of claim 6, wherein said foldable means comprises, movable frame means pivotally anchored on the vehicle, power operated extension means mounted on the movable frame means for unfolding in encircling relation about the collector means, spaced supporting ribs slidably mounted at radially inner ends on the collector means, and flexible material mounted by the supporting ribs in spaced shock-absorbing relation thereabove.

8. The combination of claim 1 wherein said collector means comprises an arcuate trough fixedly mounted on the frame means for partially encircling the tree trunk, movable trough means slidably mounted in the fixedly mounted trough and extensible therefrom to complete encirclement of the tree trunk and actuating means operatively connected to the movable trough means for extension thereof in response to extension of the foldable means.

9. The combination of claim 1, wherein said flexible sealing means comprises a sheet of foldable material having spaced hems respectively connected to the collector means and adapted to contact the tree trunk spaced yieldable rib means connected to the sheet of material tending to hold the sheet of material in a cylindrical shape and tensioning means operatively connected to opposite ends of the sheet of material and operative in response to extension of the collector means to overlap the trunk contacting rim at opposite ends thereof to contact the tree trunk and form a truncated conical shape thereabout.

10. The combination of claim 1, wherein said foldable means comprises, movable frame means mounted on the vehicle, power operated extension means operatively connected to the movable frame means for unfolding in encircling relation about the collector means, spaced supporting rib means movably mounted at radially inner ends on the collector means and operatively connected to the foldable frame means, and foldable material mounted by the supporting rib means in spaced shock-absorbing relation thereabove.

11. The combination of claim 10 wherein said movable frame means comprises a plurality of pivotally interconnected frame members, pivotal anchoring means pivotally connecting said frame members to the vehicle, means pivotally connecting said frame members to the supporting rib means and means interconnecting said power operated extension means between pairs of interconnected frame members.

12. The combination of claim 11, wherein said power operated extension means includes hydraulic actuating means fixedly mounted on some of said frame members and connected to adjacent frame members for pivotal displacement thereof with respect to the frame members mounting the actuating means, and fluid passage means formed in said frame members for conducting fluid between said actuating means.

13. A tree crop harvester adapted to be mounted on a tractor type vehicle or the like comprising, positioning frame means mounted on the vehicle for extending forwardly therefrom toward a tree trunk, collector means mounted on the frame means for receiving said tree trunk therein and extensible to a rigid condition in spaced encircling relation to said tree trunk, flexible sealing means connected to the collector means and extensible therewith to overlappingly encircle said tree trunk in yieldable contact therewith, foldable means mounted on the vehicle and operatively connected to the collector means for unfolding thereof simultaneously with the extension of the collector means and the flexible sealing means into encircling relation with the tree trunk, said foldable means comprising, movable frame means mounted on the vehicle, power operated extension means operatively connected to the movable frame means for unfolding, spaced supporting rib means movably mounted at radially inner ends on the collector means and operatively connected to the movable frame means for movement thereby, and foldable material mounted by the supporting rib means in spaced relation thereabove, said movable frame means including, a plurality of pivotally interconnected frame members, means pivotally connecting said rib means to the frame members, said power operated extension means being mounted on the rib means and operatively connected to the movable frame means.

14. The combination of claim 13 wherein said power operated extension means includes hydraulic actuating means fixedly mounted on said rib means and connected to pairs of interconnected frame members for pivotal displacement with respect to each other.

15. A tree crop harvesting machine comprising, a vehicle, a positioning frame mounted on the vehicle and extending forwardly therefrom, crop collecting means mounted on the positioning frame and adapted to be positioned thereby in spaced adjacency to a tree trunk, foldable means operatively supported by the collecting means in radially spaced relation to the tree trunk, power actuating means operatively mounted on the foldable means radially spaced from the collecting means for unfolding the foldable means thereabout into encircling relation with the tree trunk for receiving falling crops, means responsive to unfolding of the foldable means for extending the collecting means to support the foldable means in said encircling relation to the tree trunk and form a collecting trough thereabout and flexible means operatively connected to the collecting means and responsive to extension thereof to overlappingly encircle said tree trunk in peripheral contact therewith, whereby tree trunks of different size ranges may be encircled and loss of crops prevented regardless of tree trunk size.

16. The combination of claim 15, wherein said collecting trough formed by extension of the collecting means is annular in shape having an internal diameter exceeding a maximum size tree trunk diameter of crop bearing trees.

17. The combination of claim 15, wherein said flexible means includes, peripheral contact means adapted to yieldably engage said tree trunk, imperforate means interconnecting said collecting means with the peripheral contact means, and means operatively connected to the peripheral contact means and the foldable means to form a conical configuration of the imperforate means by overlapping the peripheral contact means in response to unfolding of the foldable means.

References Cited in the file of this patent
UNITED STATES PATENTS 2,692,470    Boman _______________ Oct. 26, 1954
2,714,281    Steele _______________ Aug. 2, 1955